Jan. 27, 1953    B. E. NELSON ET AL    2,626,414
BRUSH AND METHOD OF MAKING SAME

Filed July 13, 1948    4 Sheets-Sheet 1

INVENTORS
RUBEN O. PETERSON and
BY BROOKS. E. NELSON

Oberlin & Limbach
ATTORNEYS.

Jan. 27, 1953 B. E. NELSON ET AL 2,626,414
BRUSH AND METHOD OF MAKING SAME
Filed July 13, 1948 4 Sheets-Sheet 3

INVENTORS
RUBEN O. PETERSON AND
BROOKS E. NELSON
BY

ATTORNEYS.

Patented Jan. 27, 1953

2,626,414

UNITED STATES PATENT OFFICE 2,626,414

BRUSH AND METHOD OF MAKING SAME

Brooks E. Nelson, Cleveland, and Ruben O. Peterson, University Heights, Ohio, assignors to The Osborn Manufacturing Company, Cleveland, Ohio, a corporation of Ohio Application July 13, 1948, Serial No. 38,374

26 Claims. (Cl. 15—182)

This invention relates, as indicated, to brushes and method of making same, and methods for forming improved brushes from lengths of brush strip. The invention is especially concerned with brushes of the type having a formed back from which the brush material extends substantially axially, similarly to the arrangement shown in Patent No. 2,108,742 to F. J. Bickel, for example, rather than radially as shown in Patent No. 2,303,386 to R. O. Peterson. Certain inventions disclosed but not claimed herein are disclosed and claimed in our co-pending application Serial No. 222,994 filed April 26, 1951.

Brush strip of the general type described and illustrated in the aforesaid Peterson patent is adapted to rapid production in continuous lengths and may then readily be circularized with the brush material extending radially from the channelform back for mounting on a rotary mandrel or the like. Such brush strip, whether circularized or not, may be cut into desired lengths without danger of loss of brush material since the transverse teeth in the channelform back secure the retaining wire in place and additionally prevent shedding at the ends. Such ends may also be pinched closed.

When the brush strip is to be circularized or similarly deformed about an axis substantially parallel to the lay of the brush material, however, certain difficulties are at once encountered. The outer side of the back will normally be considerably stretched, with resultant tearing, while the inner side, defining an arc of less diameter, will be subjected to compression and tend to wrinkle. The openings left in the sides of the channelform back where the teeth are punched inwardly are particularly conducive to failure of the outer side of such back when subjected to severe stress, as when the bend is sharp.

It is therefore a primary object of our invention to provide novel apparatus for forming brush strip into circularized or angularly deformed shapes in which the brush material will all extend in substantially the same direction.

Another object of our invention is to provide such apparatus which is adapted for continuous operation.

Still another object of our invention is to provide a new method of thus forming brush elements whereby the brush-back may be deformed without injury thereto to achieve a superior product.

A further object is to provide a new and superior brush element especially adapted to be thus deformed without causing the usual damage thereto which has accompanied similar operations in the past.

A still further object is to provide a novel brush element having a circularized or angularly deformed back with the brush material extending in substantially parallel arrangement therefrom.

Other objects of our invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Referring now more particularly to said drawings and especially Figs. 1–10 thereof, we have provided a mandrel which is both operative to wind a length of brush strip thereon to circularize the same and simultaneously to be advanced longitudinally through the screw action of the same helical thread which serves as a seat for the back of the brush strip.

Apparatus for intermittent operation

Figure 4:
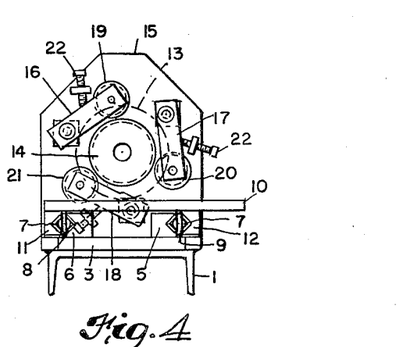
Fig. 4 is an elevational view of the other end of such apparatus taken along the line 4—4 on Fig. 2 and with the driving means omitted to better disclose other elements of the assembly.

Welded to an inverted channel base 1 are a plurality of blocks 2, 3, and 4 carrying two parallel track members 5 and 6. As best shown in Fig. 4, the outwardly facing sides of such tracks are V-shaped to receive ball bearings 7 held in fiber retainers 8 and 9 by small brass clips (not shown) in conventional manner. A platform 10 has secured to its under surface two V-blocks 11 and 12 opposed to the corresponding faces of track members 6 and 5 and engaging balls 7 therebetween. Analogously to conventional die-set mechanisms, there is sufficient friction between the relatively moving parts that, when platform 10 is caused to move along the trackway, bearings 7 and retainers 8 and 9 will be carried along therewith although at a slower rate. Consequently, when such platform has travelled all the way to the left as viewed in Fig. 2, its supporting bearings will likewise have been shifted to the left and the platform will have moved to the left-hand end of such retainers. When the platform is again shifted to the right, the various parts will return to their original positions.

Figure 1:
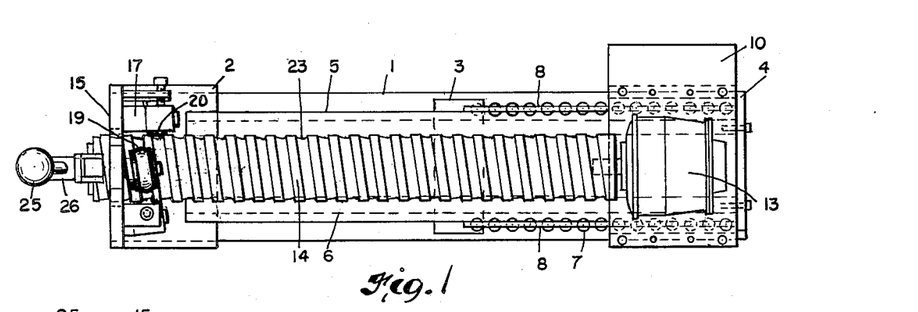
Fig. 1 is a top plan view of one form of apparatus adapted to be employed to produce our new and improved brush elements.
Figure 2:
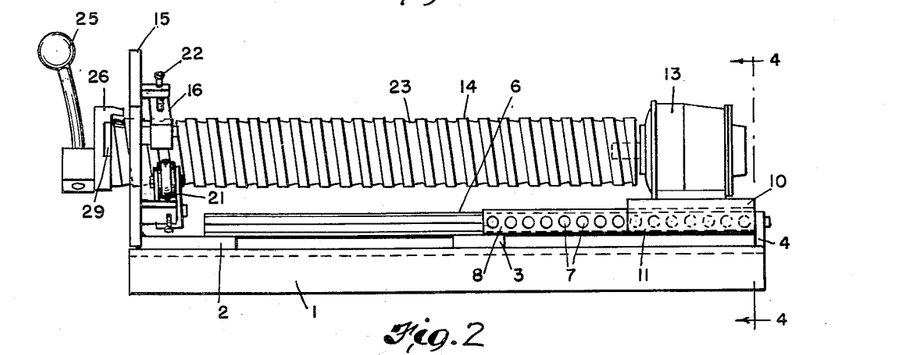
Fig. 2 is a side elevational view of the apparatus of Fig. 1.
Figure 3:
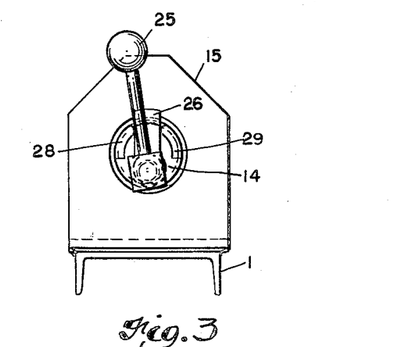
Fig. 3 is an end elevational view of such apparatus.

An electric motor 13 is mounted upon platform 10 and is adapted to travel therewith. Secured to the drive shaft of the motor is an elongated rotary helically grooved mandrel 14 adapted to be driven by such motor through conventional reduction gearing (not shown). Welded to block 2 is an upright plate 15 apertured to permit the end of mandrel 14 to protrude therethrough. On the inner or right-hand side of such plate, as viewed in Figs. 1 and 2, are pivotally mounted three arms 16, 17 and 18 carrying rollers 19, 20, and 21 at their respective ends. Adjusting screws 22 are adapted to bear against such arms to force the rollers toward the periphery of mandrel 14. Rollers 19, 20, and 21 are contoured to fit groove 23 of mandrel 14 and are also turned at a slight angle to conform to the pitch of such groove. These rollers therefore serve as supporting bearings for the mandrel and also act as a complementary engaging thread to advance the mandrel axially as it is turned by motor 13. It will thus be seen that, when the motor is energized turning the mandrel in a clockwise direction as viewed in Fig. 3, such mandrel will act as a screw and move to the left as viewed in Fig. 2, drawing the motor after it.

Figure 5:
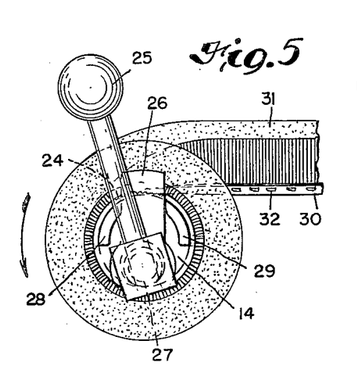
Fig. 5 is a semidiagrammatic end elevational view illustrating the manner in which the brush strip is clamped to the mandrel of such apparatus.
Figure 6:
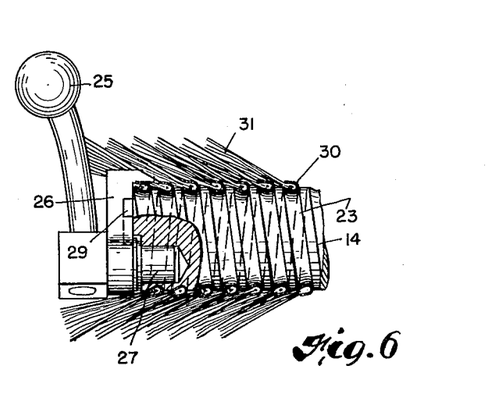
Fig. 6 is a fragmentary side elevational view of such mandrel and clamping means partly broken away to show the construction thereof and the manner in which the brush strip is wound upon such mandrel.
Figure 7:
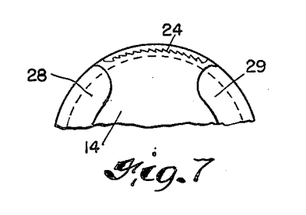
Fig. 7 is an enlarged fragmentary detail view of the end of the mandrel to which the end of a continuous length of brush strip is adapted to be clamped.

Referring now more particularly to Figs. 5–7 inclusive, the terminal portion of groove 23 at the free end of the mandrel is provided with serrations 24 adapted to engage one side of the brush strip back lying in such groove. A clamping lever 25 is pivotally mounted in the end of the mandrel and a clamping member 26 having a hooked portion adapted to override serrated portion 24 is eccentrically pivotally carried on the pivotal mount 27 of lever 25. Shoulders 28 and 29 on the end of the mandrel laterally confine clamp 26 to a position opposed to serrations 24. It will thus be seen that by turning lever 25 the end portion of a length of brush strip may be caused to be securely gripped to the end of the mandrel between such clamp and serrations. Such clamping action also serves to secure the clamping mechanism to the end of the mandrel since pivot 27 is merely inserted in a corresponding aperture in the end of the mandrel and the entire device may be axially withdrawn when unclamped.

Figure 8:
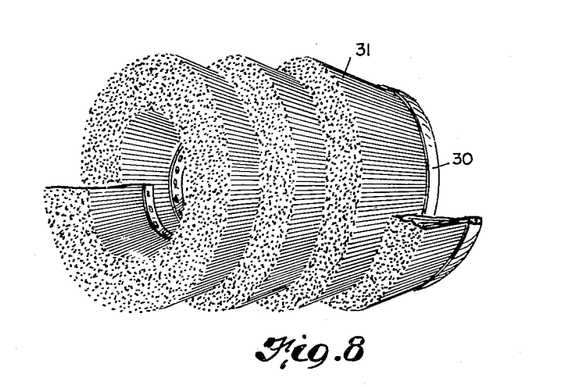
Fig. 8 is a perspective view of several turns of brush strip as produced by the circularization upon the mandrel of our novel apparatus.
Figure 9:
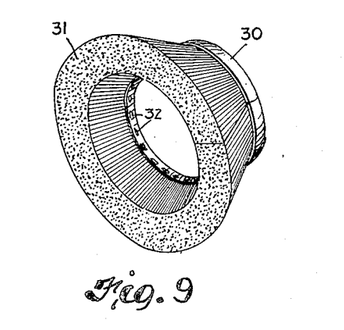
Fig. 9 is a perspective view of a hollow center end brush, such as a vacuum cleaner nozzle brush, of one type adapted to be formed from such circularized brush strip.

In operation, the end of a length of brush strip of the general type described in Peterson Patent No. 2,303,386 may be clamped to the mandrel (see Figs. 5 and 6) and motor 13 then energized. As mandrel 14 rotates and advances axially to the left as viewed in Figs. 1 and 2, the brush strip will be wound about the mandrel with the side of the channelform brush back 30 lying in groove 23. The brush material 31 will extend in a direction generally axial of the mandrel with the material of succeeding convolutions overlapping. The brush strip may be fed under tension from a supply thereof or, preferably, directly from the brush-making machine (not shown). Back tension may be provided by passing the strip between two opposed braking rollers, a tension on the order of 500 lbs. often being required to effect the necessary stretching of the edge of the inner side of the brush back. When motor 13 has travelled to the left-hand end of its trackway, it will be de-energized, preferably by tripping a limit switch (not shown), and lever 25 will be turned to release clamp 26. The clamping mechanism will then be bodily removed from the end of the mandrel and the motor reversed to return to the right-hand end of the track. Since the helically wound brush strip is no longer secured to mandrel 14, the mandrel will simply be unscrewed therefrom leaving the turns unsupported except that the operator may desirably insert a manually held rod therethrough. When the mandrel has been completely withdrawn, the brush back 30 will be severed at the beginning of its last (right-hand) turn and the series of convolutions dropped into a container for future use. Such convolutions, as shown in Fig. 8, may thereupon be cut into desired lengths, a single convolution (Fig. 9) being suitable for use as a vacuum cleaner duster brush, for example. The opposed ends of such convolution may be welded or otherwise secured together or they may be left slightly spaced apart so that, when forced together and inserted into an appropriate holder, there will be sufficient outward spring action of the same to securely retain the back within the lip of such holder. Since, as shown in Patent No. 2,303,386 and further explained below, teeth will desirably be provided punched in from the sides of the brush back to hold a wire retaining member in place, there is no danger of shedding of brush material from the severed ends of the strip. Furthermore, where thus severed, the sides of the channelform back may desirably be pinched together.

The end of the brush strip from the brushmaking machine may now again be clamped to the end of mandrel 14 and the winding operation repeated. It will thus be seen that we have provided a device for the intermittent production of a circularized brush element which is relatively simple in construction and operation and which may be readily adapted to the production of brush elements of various diameters and sizes. Thus, mandrel 14 may be removed and replaced by a similar mandrel of a lesser diameter, appropriate adjustment being made of rollers 19, 20, and 21.

The brush strip

We have found that a very important relationship exists between the form of brush back employed and the conformation of the helical groove 23 of the mandrel. When circularizing brush strip having a channelform back in accordance with the present invention, it is obvious that the outer side of such back is required to describe an arc of considerably greater diameter than the inner side of the back, and this naturally results in the setting up of very severe stresses. The inner side of the back is subjected to a high degree of compression, and the lip or edge thereof tends to buckle or wrinkle. The outer side is severely stretched, and there is very considerable danger of tearing of its lip or edge. These stresses and strains are concentrated and accentuated by the apertures 32 left in the sides of the channelform back where the teeth 33 have been punched inwardly to secure the elongated retaining member such as wire 34 in place. Such teeth and apertures will desirably be of the shape described in Patent No. 2,303,386 but, even so, there is very considerable danger of tearing and wrinkling when the strip is thus circularized to form a brush element in which the brush material extends substantially parallel rather than radially. The problem is, of course, especially acute when the brush strip is circularized about a particularly small radius or bent at a sharp angle. As the elongation required of the outer side of the channelform back approaches its ultimate strength, the work hardening of the material of the back compels the application of still greater force to accomplish the bending which in turn generates greater compressive forces on the inner side of the back. When a certain amount of bending has taken place, the edge of the inner side of the back, being inadequately supported by the somewhat compressible brush material within the brush strip, collapses under such compressive force and wrinkles, making a very undesirable condition.

To assist in avoiding such detrimental effect, groove 23 of the mandrel slopes so that that portion of the groove which supports the edge of the inner side of the brush back lies at a greater mandrel diameter than that portion of the groove which supports the back adjacent its base. Accordingly, the edge or lip portion of the inner side of the channelform back will also be somewhat stretched or elongated, although not to the degree that the edge or lip of the outer side of the channelform back is thus stretched. The portion of the brush back lying in groove 23 at its minimum diameter will, of course, not be stretched at all. By thus providing for elongation of the lip or edge of the inner side of the brush back during the forming operation, the compressive forces exerted thereon above referred to are counterbalanced to a degree sufficient to prevent buckling or wrinkling.

Figure 10:
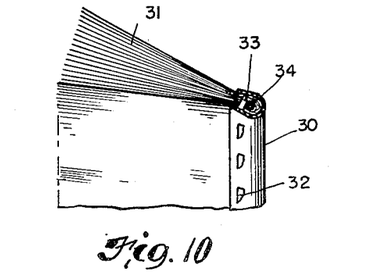
Fig. 10 is a fragmentary detail view of the end portion of one type of brush strip particularly adapted for circularization or other similar deformation in accordance with our invention.
Figure 13:
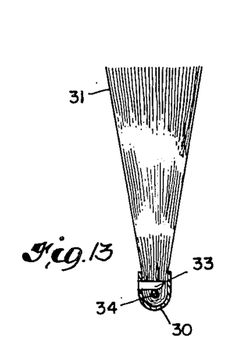
Fig. 13 illustrates in cross-section a special form of brush strip particularly adapted for circularization or deformation in accordance with our invention.
Figure 14:
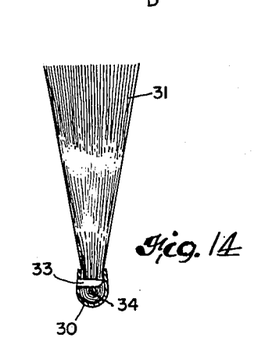
Fig. 14 shows the same brush strip subsequent to such deformation.

Since the edge or lip of the outer side of the brush back naturally resists stretching when the strip is circularized, it will be drawn inwardly toward the other side of the channel, thereby somewhat compressing the brush material at this point. Due to this action we have found that it is generally not necessary to provide the teeth 33 projecting inwardly from both sides of the back but instead such teeth may be provided only on the inner side thereof (see Fig. 10). Concentration of stresses in such outer side are thereby avoided so that the same may now be elongated without danger of tearing, even when the strip is circularized about a very small radius or bent at a sharp angle. Fig. 13 illustrates this form of brush strip in cross-section prior to circularization or bending, while Figs. 10 and 14 show the same subsequent to such forming operation. It will be understood that the degree to which the sides of the channelform back will be thus respectively inwardly inclined (toward the brush material) will depend upon both the size of the brush back and the degree of bending employed. The degree of slope of groove 23 from the base of the channelform back to the lip of the inner side thereof will be correspondingly modified.

It is, of course, possible to employ such a dense fill of brush material that the radially inward pull of the outer lip of the curved channel back is resisted to a degree where such outer lip cannot incline inwardly and may even flare outwardly somewhat. In such case the active clamping action on the brush material will be even greater although the channel neck may not be constricted. The degree of resistance to the compressive action of the outer side of the channel will also depend considerably on the character of the brush material itself.

Spiral winding mechanism

Figure 15:
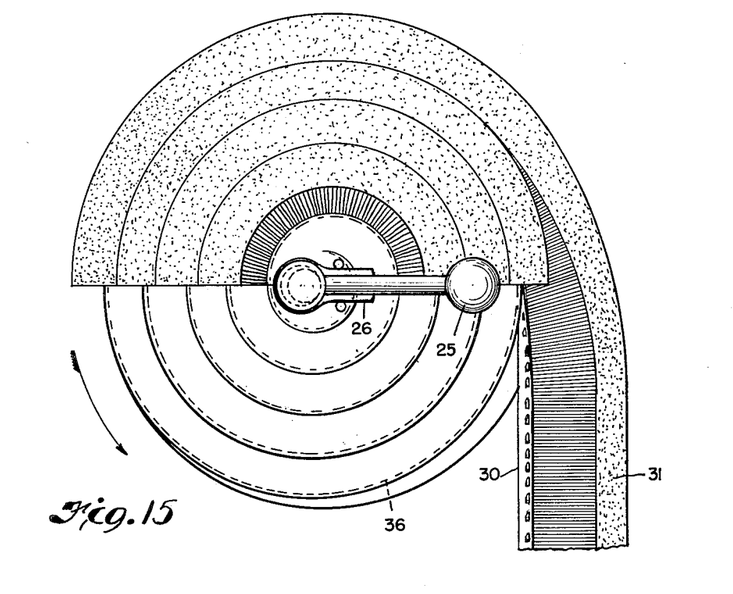
Fig. 15 shows another form of mandrel adapted to wind the brush strip to spiral form, a portion of the brush strip being cut away to better disclose the configuration of such mandrel.
Figures 16, 17, 18:
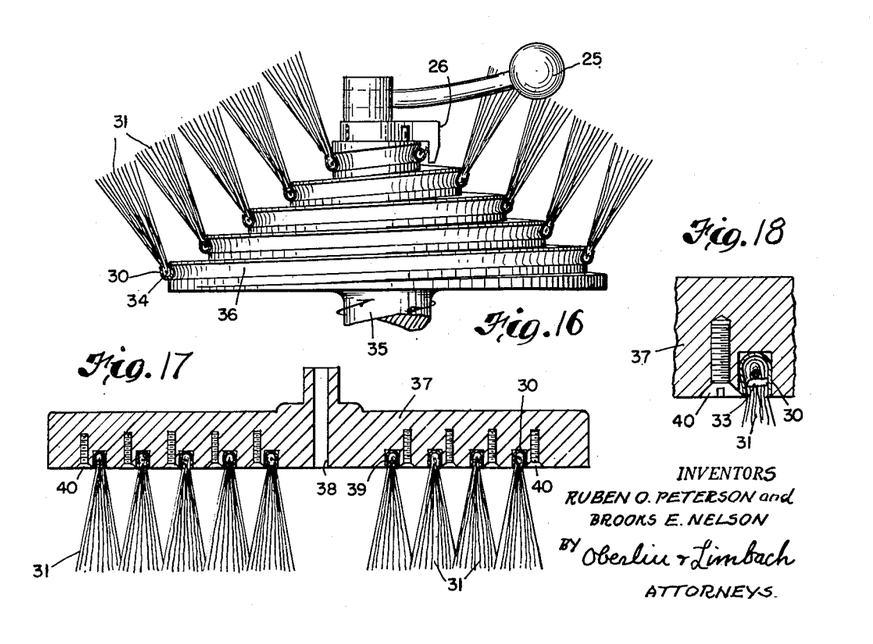
Fig. 16 is an elevational view of the mandrel of Fig. 15.
Fig. 17 is a vertical cross-sectional view of a scrubbing or polishing brush head utilizing the spiral brush element produced on the apparatus of Fig. 16.
Fig. 18 is an enlarged detail view showing the manner of retaining such spiral brush element within the holder.

Figs. 15 and 16 of the drawing illustrate a modified form of mandrel upon which the brush strip is adapted to be wound to produce a novel spiral brushing element useful for many purposes. In this modification, the driven shaft or mandrel 35 is formed at its end into a generally conical portion provided with a stepped spiral groove 26 which is sloped to seat the brush strip as above discussed. In such construction, shaft 35 may be journaled in conventional bearings and the mandrel axially advanced by a separate screw feed mechanism (not shown) or such shaft may itself be threaded and caused to move axially in the same manner as the mandrel of Fig. 1. The end of the brush strip will be clamped to the smaller (outer) end of the mandrel by means of the same form of clamping mechanism above described, and the mandrel rotated to wind the brush strip thereon. Upon releasing such clamp and reversing the mandrel, a spiral brush element will have been produced which may then be severed from the source of supply of such strip and either cut into arcuate segments of desired length for various purposes or compressed to form a brush element in which the entire length of brush back lies in the same plane. An element of the latter sort is particularly adapted to be mounted in the rotary head 37 of a scrubbing machine having an axial opening 38 therethrough for the introduction of a cleaning fluid or polishing medium, for example. The underside of such head 37 will be provided with a spiral groove 39 to receive the spiral convolutions of the brush element, the latter being retained therein by means of screws 40, the heads of which overlie and bear against one lip of the channelform back 30.

It will be seen that the scrubbing head of the type described may be employed in either of two ways. Such head may be rotated in one direction so that a fluid or abrasive fed through opening 38 will be conducted by the spiral convolutions of the brush element laterally to the exterior of the brush, or such fluid or abrasive may be applied to the surface to be acted upon and the brush head rotated in the opposite direction, whereupon the spiral formation of the brush element will cause the same to be conducted to the center of the brush head from which it may be withdrawn by suction applied to opening 38.

A somewhat similar brush head may be formed by seating a plurality of annular brush elements of different diameters, one within the other, in corresponding concentric annular grooves in the underside of such head.

While a relatively simple form of channel cross-section has been illustrated, it will be understood that a variety of forms may be employed, including channels having constricted pressure necks.

General brush form

While the strip will generally be curved with the brush material extending substantially in the same direction, i. e. parallel with the axis of curvature, a considerable degree of flare may be provided (Fig. 9) and our new method of bending such strip will be advantageously employed whenever one side of the channel back is required to define an arc of greater diameter than the other side. Thus, a non-radial brush, but one having a very high degree of flare, may be formed in accordance with our invention for special purposes.

The mandrel about which the strip is formed need not necessarily be of circular cross-section but may, for example, be of triangular or hexagonal cross-section with somewhat rounded corners to produce correspondingly shaped convolutions. The shorter the radius of curvature the more important it becomes that the punched-in teeth be omitted from the outer side of the channelform back. This is especially the case when wire brush material is employed for the fill since pressure of strands of such wire against the stressed outer edge of the channel side is particularly conducive to rupture thereof. Since the outer side edge or lip is drawn toward the inner lip during the forming operation, the teeth extending from the inner side of the turn more closely approach such outer side and are thereby enabled adequately to secure the wire retaining member 34.

As above indicated, and shown in the drawing, the bottom groove 23 in the mandrel will slope so that while sufficiently deep to accommodate a portion of the base of the back the other side of the groove just barely engages the lip of the inner side of such back. This ensures proper positioning of the strip on the mandrel without interference from the brush material. While the base of the channelform brush back will generally be somewhat rounded, it may also be flat, with the shape of groove 23 being correspondingly modified.

Any desired brush material may be employed as fill, such as tampico fiber, crimped wire, cord, horsehair, nylon, etc.

Continuous form

The Fig. 1 form of apparatus may be modified for continuous operation as described below, this being particularly desirable when large quantities of a particular size and shape of circularized brush element are to be produced, the brush strip being taken directly from the brush strip machine as produced. Means will, however, ordinarily be interposed between such machine and winding apparatus to maintain a uniform tension and rate of feed, either in the form of takeup means for the strip or synchronizing means for the machines, or both.

Figure 11:
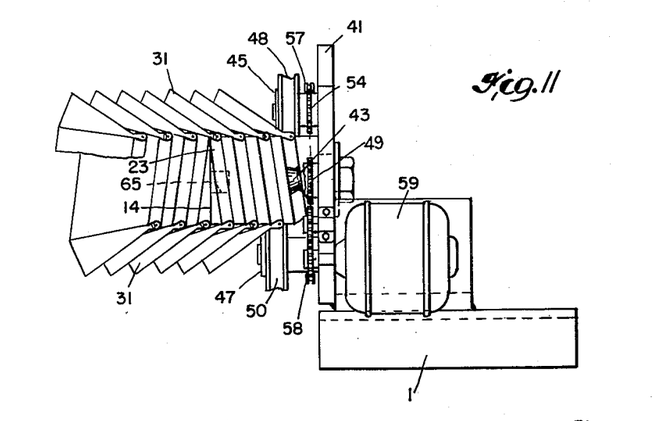
Fig. 11 is a side elevational view of a modified form of apparatus for circularizing the brush strip.
Figure 12:
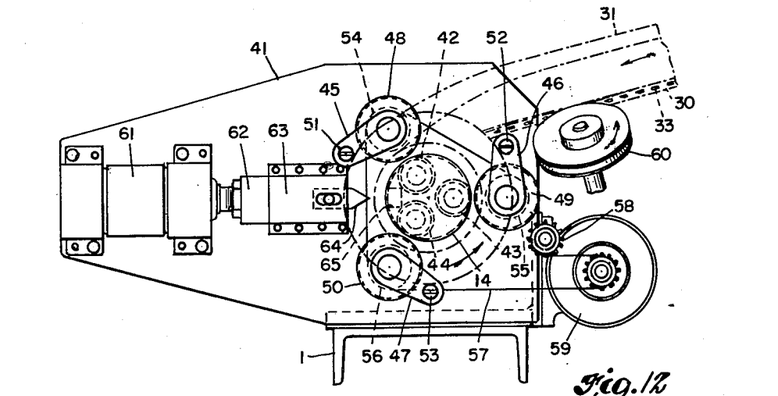
Fig. 12 is an end elevational view of such apparatus also showing cut-off means.

Referring now more particularly to Figs. 11 and 12 of the drawing, the mandrel 14 is non-rotatably mounted on plate or bracket 41 corresponding generally to plate 15 of the Fig. 1 embodiment. Groove 23 is of the same contour as before but the brush strip back is caused to move along such groove and the mandrel is not shifted axially. Inset within the mandrel adjacent plate 41 are three idler rollers 42, 43, and 44 aligned with groove 23 and correspondingly grooved at their peripheries. Pivotally mounted on arms 45, 46 and 47 pivotally carried by plate 41 are three pressure rollers 48, 49 and 50 respectively adapted to be opposed to said internal idler or back-up rollers 42, 43, and 44. Such pressure rollers are also grooved at their peripheries to conform to the contour of the brush strip back. Such pressure rollers are held in adjusted position by tightening cap screws 51, 52 and 53.

Each pressure roller is driven in a clockwise direction as viewed in Fig. 12 by means of sprockets 54, 55 and 56 and chain 57, such chain engaging each of such sprockets and a take-up sprocket 58. The chain is driven by electric motor 59.

A pair of opposed rollers such as 60 may desirably be provided adjacent to the machine to engage the brush back 30 therebetween, such rollers being braked by any conventional means to apply back tension to the back as it is drawn upon the mandrel.

The brush strip from the brush strip making machine or other source is passed between back tension rollers 60 and then around mandrel 14 in groove 23 and under driven pressure rollers 48, 49 and 50. These latter rollers serve to form and advance the strip along helical groove 23, with the circularized strip spiraling off the mandrel end.

Under some circumstances the back tension rollers may be omitted when the strip is being drawn directly from the brush strip forming machine and the power driven rollers of the winding machine may assist in drawing the strip through the dies of such forming machine. It will thus be seen that our winding machine performs the several functions of advancing the strip, winding the same, and bending in and stretching the side of the channel back on the inside of the turn.

When the brush strip is to be circularized about a fairly large diameter, the strip may be advanced by driving rollers 60 with rollers 48, 49 and 50 being idlers, but the contrary mode of operation above described is generally much preferred.

Cut-off means

Also carried by a lateral extension of plate 41 is a small hydraulic cylinder 61, the piston extension 62 of which is supported in a slide bracket 63. A tool steel or tungsten carbide cutting element 64 is inserted in the end of such extension 62, such cylinder, piston and cutting element being reciprocable in a direction radially of mandrel 14. (See Fig. 12.) An anvil 65 of similar material is inserted in such mandrel opposite to such element. Any desired timing means for actuating cylinder 61 may be employed, a particularly satisfactory form comprising a small wheel engaging the brush back 30 at a point between rollers 60 and 48. Such wheel will be rotated by passage of the strip and may drive a conventional counter (not shown) operative to control valving of hydraulic fluid to cylinder 61. Since such counters are readily set for any desired length of strip, it may be set to cause the desired number of convolutions to be cut off, whatever the diameter of mandrel currently being employed.

It will be seen from the foregoing that we have provided new apparatus, method and product which avoid the difficulties of the prior art. The examples of apparatus shown and described illustrate methods of both intermittent and continuous manufacture. A new and improved curved brush element is provided in which the edges of the brush strip back are not buckled or torn and in which the inner edge is stretched as well as the outer edge.

When non-circular (e. g., triangular) shapes are to be formed, it may sometimes be preferred to employ a radial rather than a helical groove about the periphery of the mandrel, the brush strip being severed in single turns as produced. This simplifies the apparatus and operation thereof somewhat.

Other modes of applying the principle of the invention may be employed, change being made as regards the details described, provided the features stated in any of the following claims or the equivalent of such be employed.

We therefore particularly point out and distinctly claim as our invention:

1. As a new article of manufacture, a brush element comprising a length of brush strip having a unitary channel shaped back circularized about an axis substantially parallel to the sides of said back, said strip having a wire retaining member disposed lengthwise within said back, brush material secured in said back by said retaining member, and teeth projecting from that side of said circularized back on the inner side of the curve and overlying said wire retaining member, both sides of said back sloping toward each other.

2. As a new article of manufacture, a brush element comprising a curved length of brush strip having a unitary channelform back deformed about an axis generally parallel to the sides of said back, said strip having an elongated retaining member disposed lengthwise therein, brush material secured in said back by said retaining member, and teeth projecting from that side of said channelform back on the inner side of such curve only and overlying said retaining member, both sides of said channelform back sloping toward each other.

3. As a new article of manufacture, a brush element comprising a curved length of brush strip having a unitary channelform back deformed about an axis not normal to the sides of said back, said strip having an elongated retaining member disposed lengthwise therein, brush material secured in said back by said retaining member, and teeth projecting from that side of said channelform back on the inner side of such curve only and overlying said retaining member.

4. As a new article of manufacture, a brush element comprising a curved length of brush strip deformed about an axis generally parallel to the lay of the brush material, said strip comprising a channelform back, an elongated retaining member disposed lengthwise therein, brush material secured in said back by said retaining member, and teeth projecting from that side of said channelform back on the inner side of such curve only and overlying said retaining member, the outer toothless side of said channelform back sloping in toward the side bearing said teeth.

5. As a new article of manufacture, flexible elongated brush strip comprising a unitary channelform back, a wire retaining member disposed lengthwise therein, brush material held in said back by said retaining member, and teeth punched in from one side of said back only and overlying said wire retaining member, the other side of said back sloping toward such side bearing said teeth to assist in securing said retaining member thereunder, said article being particularly adapted for bending generally laterally with such toothed side on the inner side of the resultant bend to avoid tearing of said back.

6. As a new article of manufacture, flexible elongated brush strip comprising a unitary channelform back, an elongated retaining member disposed lengthwise therein, brush material held in said back by said retaining member, and teeth carried by one side of said back only and overlying said retaining member, the other side of said back sloping toward such side carrying said teeth to assist in securing said retaining member thereunder, said article being particularly adapted for bending generally laterally with such toothed side on the inner side of the resultant bend to avoid tearing of said back.

7. As a new article of manufacture, brush strip comprising a unitary channelform back, an elongated retaining member disposed lengthwise therein, brush material held in said back by said retaining member, and teeth carried by one side of said back only and overlying said retaining member, the other side of said back sloping toward such side carrying said teeth to assist in securing said retaining member thereunder and said strip being arcuately bent with the sides of said channelform back and said brush material projecting non-radially of the axis of such bending, the toothed side of said back lying on the inner side of such bend.

8. As a new article of manufacture, a spiral length of brush strip deformed about an axis generally parallel to the lay of the brush material, said strip comprising a channelform back, a wire retaining member disposed lengthwise within said back, brush material secured in said back by said retaining member, and teeth projecting from that side of said spiral back on the inner side of the curve only and overlying said retaining member, both sides of said channelform back sloping toward each other.

9. As a new article of manufacture, a spiral length of brush strip deformed about an axis generally parallel to the lay of the brush material, said strip comprising a channelform back, an elongated retaining member disposed lengthwise within said back, brush material secured in said back by said retaining member, and teeth projecting from that side of said spiral back on the inner side of the curve only and overlying said retaining member.

10. As a new article of manufacture, a spiral length of brush strip deformed about an axis generally parallel to the lay of the brush material, said strip comprising a channelform back, an elongated retaining member disposed lengthwise within said back, brush material secured in said back by said retaining member, and teeth projecting from that side of said spiral back on the inner side of the curve only and overlying said retaining member, said spiral back lying in one plane throughout.

11. As a new article of manufacture, a brush element comprising a single turn of brush strip comprising a channelform back, an elongated retaining member disposed lengthwise therein, brush material held in said back by said retaining member, and teeth projecting from that side of said back on the inner side of the turn only and overlying said retaining member, the two ends of said turn being opposed and slightly spaced to permit their being resiliently forced toward one another.

12. A method of circularizing brush strip having a channelform back with a layer of brush material extending therefrom which comprises winding such strip helically about an arbor with the brush material extending generally axially of such arbor, applying back tension to such strip during such winding operation, and stretching both edges of such channelform back relative to the base of such back at the inside of the curve.

13. In the curvilinear forming of brush strip into curved brush elements, the steps of bending a length of brush strip having a channelform back with a layer of brush material extending therefrom, with such brush material extending generally parallel to the axis of bending, applying back tension to such strip during such bending operation, and stretching both edges of such channelform back relative to the base of such back at the inside of the curve.

14. In the curvilinear forming of brush strip having a channelform back, an elongated retaining member disposed lengthwise within such back, brush material held in such back beneath such retaining member, and teeth extending inwardly from one side of such back only and overlying such retaining member to secure the same; the steps of bending such back about an axis generally parallel to the lay of such brush material and with the toothed side of such back on the inside of such bend, applying back tension to such strip during such bending operation, and stretching both edges of such channelform back relative to the portion of the base thereof at the inside of such bend.

15. In the curvilinear forming of brush strip into curved brush elements, the steps of bending a length of brush strip having a channelform back with a layer of brush material extending therefrom, with such brush material extending generally parallel to the axis of bending, applying back tension to such strip during such bending operation, and stretching both edges of such channelform back relative to the base of such back at the inside of the curve, the edge of the outer side of such back being stretched to a greater degree than the edge of the inner side of such back.

16. In the curvilinear forming of brush strip having a unitary channelform back with a layer of brush material extending therefrom, the steps of bending a length of such strip with the sides of such channelform back and such layer of brush material projecting non-radially of the axis of such bend, and stretching both edges of such channelform back relative to the base of such back at the inside of the curve.

17. In the curvilinear forming of brush strip having a unitary channelform back with a layer of brush material extending therefrom, the steps of bending a length of such strip with the sides of such channelform back and such layer of brush material projecting non-radially of the axis of such bend, and stretching both edges of such channelform back relative to the base of such back at the inside of the curve, the edge of the outer side of such back being stretched to a greater degree than the edge of the inner side of such back during such bending operation.

18. As a new article of manufacture, a brush element comprising a unitary channel back, and a layer of brush material retained in and extending from said back, said channel back being bent in a curve with the sides of said channel projecting non-radially of the axis of such bending and with both edges of said channel sides stretched relative to the portion of said channel describing the curve of smallest radius.

19. As a new article of manufacture, a brush element comprising a length of brush strip deformed about an axis generally parallel to the lay of the brush material, said strip comprising a channel back, a wire retaining member disposed lengthwise within said back, brush material secured in said back by said retaining member, and teeth projecting from that side of said channel back on the inner side of the curve of deformation and overlying said wire retaining member, the edge of the channel side nearest such axis of deformation being further removed radially of such axis than a base portion of such side.

20. As a new article of manufacture, a brush element comprising a length of brush strip deformed about an axis generally parallel to the lay of the brush material, said strip comprising a channel back, a wire retaining member disposed lengthwise within said back, brush material secured in said back by said retaining member, and teeth projecting from that side of said channel back on the inner side of the curve of deformation only and overlying said wire retaining member, the edge of the channel side nearest such axis of deformation being further removed radially of such axis than a base portion of such side.

21. As a new article of manufacture, a brush element comprising a length of brush strip deformed about an axis generally parallel to the lay of the brush material, said strip comprising a channel back, a wire retaining member disposed lengthwise within said back, brush material secured in said back by said retaining member, and teeth projecting from that side of said channel back on the inner side of the curve of deformation only and overlying said wire retaining member, the edge of the channel side nearest such axis of deformation being further removed radially of such axis than a base portion of such side, and the radially outer side of said deformed channel back being under tension and actively pressing against said brush material to firmly clamp the same.

22. In the curvilinear deforming of brush strip having a unitary channel back and a layer of brush material extending therefrom, the steps of bending such channel back with the sides thereof projecting non-radially of the axis of such bending, supporting the entire channel side of the inside of the bend with the edge thereof further radially spaced from the axis of bending than a basal portion thereof, and exerting tension on such channel during such bending operation to stretch such channel edge relative to such basal portion.

23. As a new article of manufacture, a brush element comprising a unitary channelform back having a layer of brush material retained therein and extending therefrom, said back being deformed into a plurality of helical convolutions with the central plane of said channel and layer of brush material extending in a direction other than normal to the axis of such helix, and both side edges of said back being stretched relative to the portion of said channel describing the curve of shortest radius.

24. As a new article of manufacture, a brush element comprising a unitary channelform back having a layer of brush material retained therein and extending therefrom, said back being deformed into a plurality of helical convolutions with the central plane of said channel and layer of brush material extending in a direction other than normal to the axis of such helix, an elongated retaining member disposed lengthwise within said back to secure such brush material therein, and teeth projecting from that side of said channelform back on the inner side of such curve only and overlying said retaining member.

25. As a new article of manufacture, a brush element comprising a curved length of brush strip having a unitary channelform back and a layer of brush material secured therein and extending therefrom, said back being deformed about an axis substantially inclined from normal to the lay of said brush material, and teeth punched inwardly of such channel from that side of said channel form back on the inner side of such curve only to assist in securing said brush material, the other side of said back sloping toward the side having said teeth.

26. As a new article of manufacture, a brush element comprising a unitary channel back of sheet material, a layer of brush material retained in and extending from such channel, and teeth punched inwardly from a side of such channel to assist in securing such brush material therein, said channel back being bent in a curve with the sides of such channel extending non-radially of such curve and with both edges of such channel sides stretched relative to the portion of said channel back describing the curve of smallest radius.

BROOKS E. NELSON.
RUBEN O. PETERSON.

REFERENCES CITED

The following references are of record in the file of this patent:

UNITED STATES PATENTS

| Number | Name | Date |
|---|---|---|
| 1,209,639 | Carter | Dec. 19, 1916 |
| 1,548,898 | Nielson | Aug. 11, 1925 |
| 1,900,575 | Mertes | Mar. 7, 1933 |
| 1,941,343 | Epp | Dec. 26, 1933 |
| 1,963,044 | Bickel | June 12, 1934 |
| 1,979,240 | Adelmann | Nov. 6, 1934 |
| 2,108,742 | Bickel | Feb. 15, 1938 |
| 2,176,861 | Smith | Oct. 17, 1939 |
| 2,267,584 | Cave | Dec. 23, 1941 |